United States Patent
Yamamoto

(10) Patent No.: US 8,489,315 B2
(45) Date of Patent: Jul. 16, 2013

(54) DEVICES, METHODS, AND PROGRAMS THAT PROVIDE VEHICLE GUIDANCE FOR POWER RECEPTION

(75) Inventor: Takahiro Yamamoto, Gamagori (JP)

(73) Assignee: Aisin AW Co., Ltd., Anjo (JP)

( * ) Notice: Subject to any disclaimer, the term of this patent is extended or adjusted under 35 U.S.C. 154(b) by 562 days.

(21) Appl. No.: 12/654,150

(22) Filed: Dec. 11, 2009

(65) Prior Publication Data

US 2010/0161217 A1 Jun. 24, 2010

(30) Foreign Application Priority Data

Dec. 22, 2008 (JP) ................. 2008-326164

(51) Int. Cl.
- G06G 7/70 (2006.01)
- G07C 5/08 (2006.01)
- G01C 21/00 (2006.01)
- H02J 7/00 (2006.01)

(52) U.S. Cl.
CPC .. G06G 7/70 (2013.01); G07C 5/08 (2013.01); G01C 21/00 (2013.01); H02J 7/0047 (2013.01)
USPC .......... 701/123; 701/29.1; 701/400; 701/408; 320/108; 320/109

(58) Field of Classification Search
USPC ................. 701/29.1, 400, 408, 123; 320/106, 320/108, 109; 318/587; 191/14
See application file for complete search history.

(56) References Cited

U.S. PATENT DOCUMENTS

| | | | | |
|---|---|---|---|---|
| 4,347,472 A | * | 8/1982 | Lemelson | 320/108 |
| 4,800,328 A | * | 1/1989 | Bolger et al. | 320/106 |
| 5,617,003 A | * | 4/1997 | Odachi et al. | 320/108 |
| 5,654,621 A | * | 8/1997 | Seelig | 320/108 |
| 5,703,461 A | * | 12/1997 | Minoshima et al. | 320/108 |
| 5,821,731 A | * | 10/1998 | Kuki et al. | 320/108 |
| 5,892,346 A | * | 4/1999 | Moroto et al. | 318/587 |
| 2007/0131505 A1 | * | 6/2007 | Kim | 191/14 |
| 2010/0017249 A1 | * | 1/2010 | Fincham et al. | 705/8 |
| 2010/0117596 A1 | * | 5/2010 | Cook et al. | 320/108 |

FOREIGN PATENT DOCUMENTS

| | | |
|---|---|---|
| EP | 0 788 212 A2 | 8/1997 |
| JP | A 5-111168 | 4/1993 |
| WO | WO 00/54387 A1 | 9/2000 |

OTHER PUBLICATIONS

May 3, 2010 European Search Report issued in EP 09 01 5197.

* cited by examiner

*Primary Examiner* — Thomas Black
*Assistant Examiner* — Dale W Hilgendorf
(74) *Attorney, Agent, or Firm* — Oliff & Berridge, PLC

(57) ABSTRACT

Power reception guidance devices, methods, and programs guide a vehicle having a power receiving unit to a non-contact power supply of a power supply unit installed in a parking area. The devices, methods, and programs calculate a power receiving efficiency of the power receiving unit at a current parking position of the vehicle in the parking area, determine whether the current parking position must be changed based on the calculated power receiving efficiency, and output information based on the determination to an output unit.

16 Claims, 14 Drawing Sheets

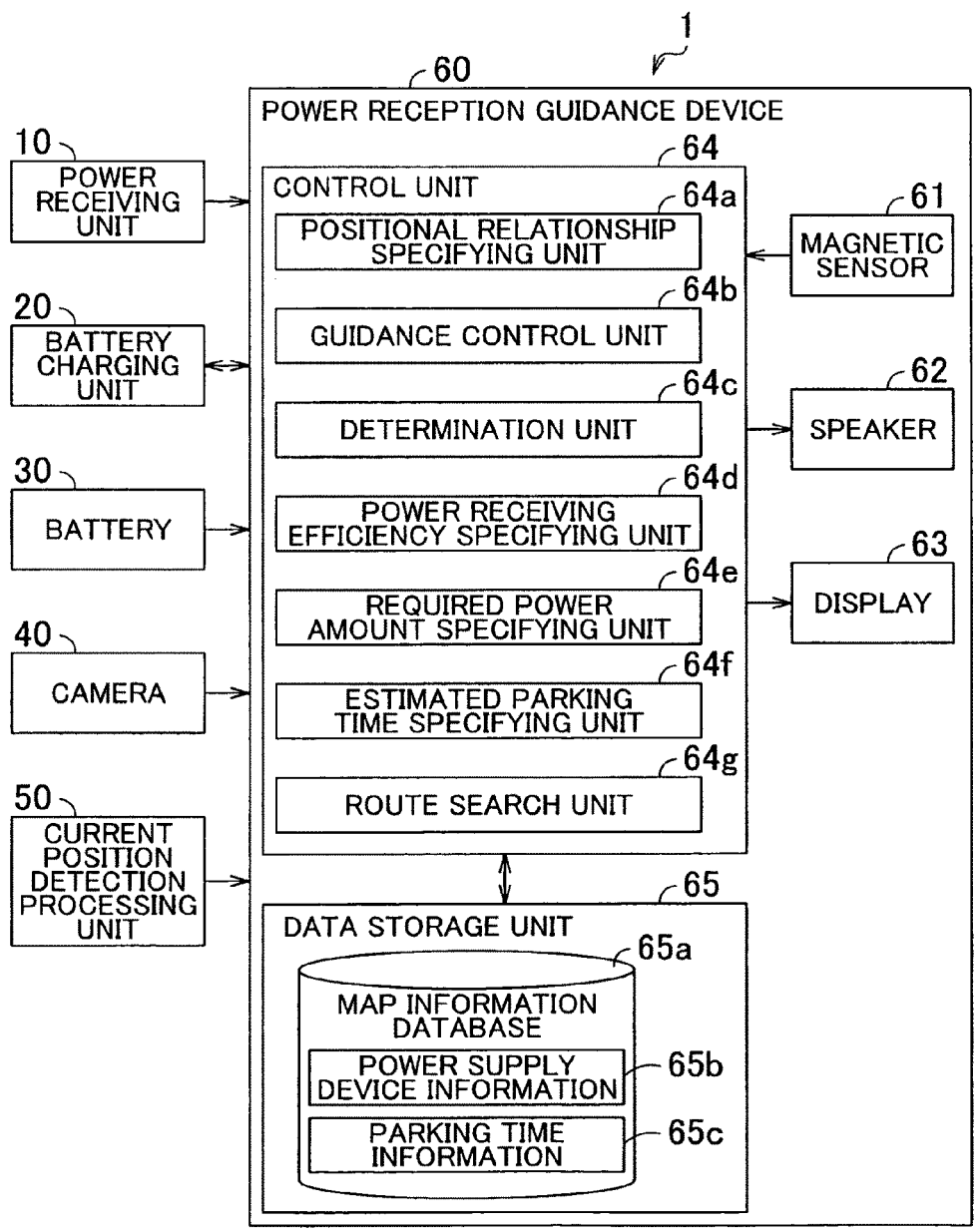

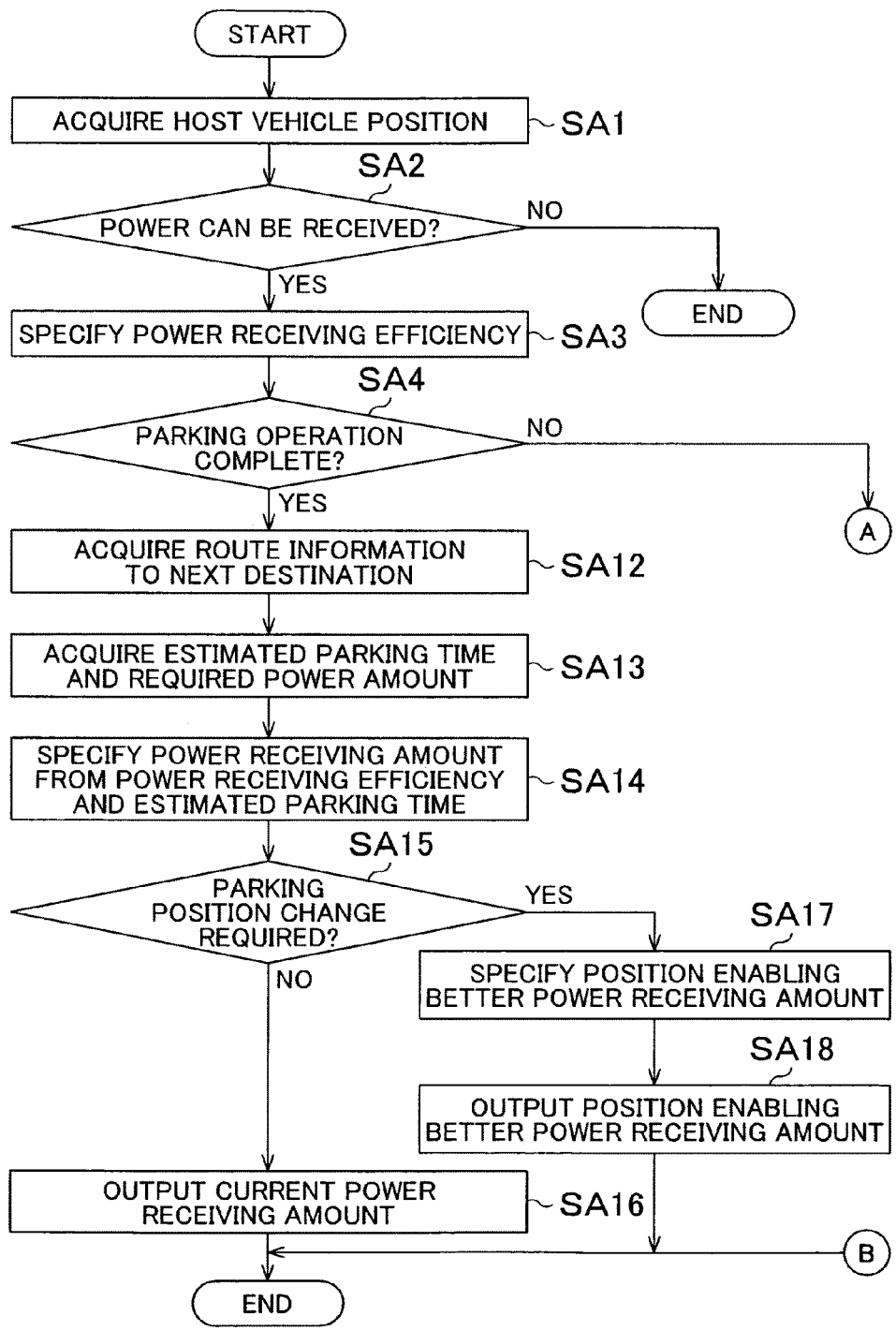

F I G. 4
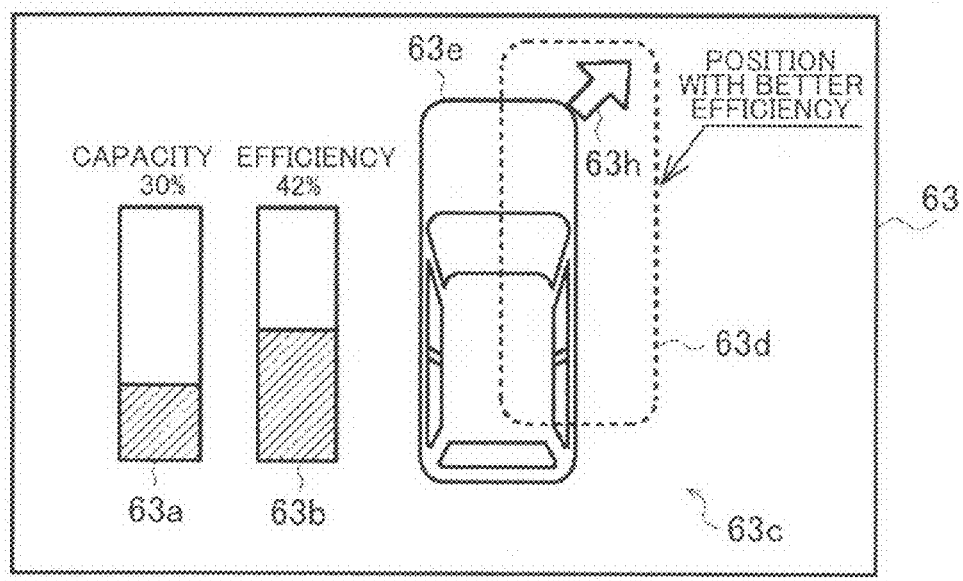
F I G. 5
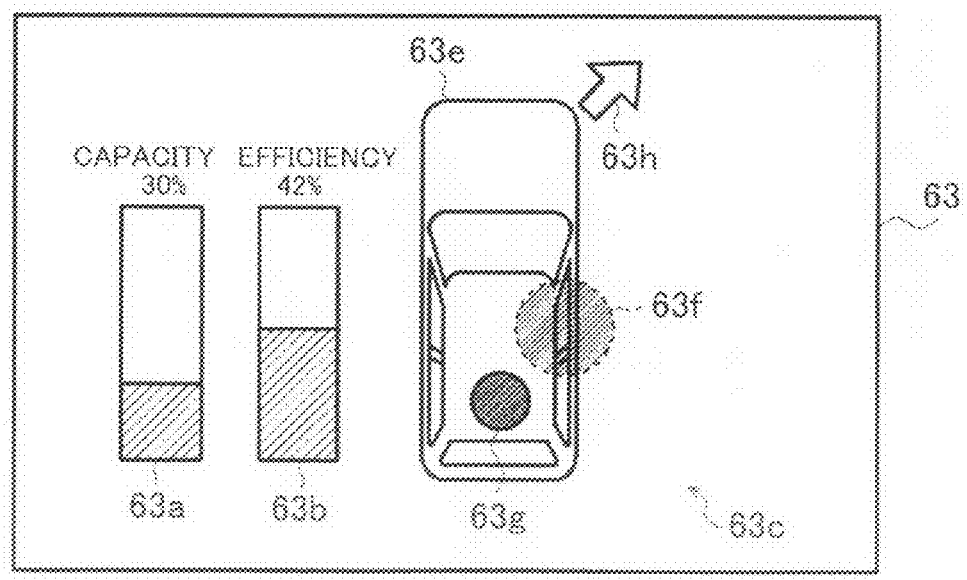

DEVICES, METHODS, AND PROGRAMS THAT PROVIDE VEHICLE GUIDANCE FOR POWER RECEPTION

INCORPORATION BY REFERENCE

The disclosure of Japanese Patent Application No. 2008-326164 filed on Dec. 22, 2008, including the specification, drawings and abstract is incorporated herein by reference in its entirety.

BACKGROUND

1. Related Technical Fields

Relates technical fields include devices, methods, and programs that provide vehicle guidance for power reception.

2. Description of the Related Art

A conventional battery charger for a battery installed in a vehicle enables non-contact charging from outside the vehicle. For example, a battery charger has been proposed that supplies an alternating current to a power supply side coil installed at a parking lot or the like generates an alternating current through electromagnetic induction in a power receiving side coil that is installed in a vehicle, such that power is supplied to the battery from the power receiving side coil (see Japanese Patent Application Publication No. JP-A-H05-111168, paragraphs [0010] and [0011]).

SUMMARY

A conventional battery charger using electromagnetic induction such as the one described above requires that the power supply side coil and the power receiving side coil be suitably disposed with respect to each other in order to efficiently transmit power from the power supply side coil to the power receiving side coil. To this end, the power supply side coil of the conventional battery charger may be moved depending on the stop position of the vehicle.

In some cases, however, the power supply side coil of the conventional battery charger cannot be disposed at a suitable position such as when the power supply side coil is fixed and cannot be moved, and when the vehicle has stopped at a position to which the power supply side coil cannot be moved. Therefore, it may be necessary to correct the position of the vehicle. However, the conventional battery charger cannot provide guidance regarding the suitability of the position of the vehicle for charging. Consequently, the user cannot find out how suitable the position of the vehicle is for charging.

Exemplary implementations of the broad inventive principles described herein provide a guidance device for power reception, a guidance method for power reception, and a guidance program for power reception, which provide guidance regarding whether a parking position must be changed based on the suitability of a position of a vehicle for charging.

Exemplary implementations provide power reception guidance devices, methods, and programs that guide a vehicle having a power receiving unit to a non-contact power supply of a power supply unit installed in a parking area. The devices, methods, and programs calculate a power receiving efficiency of the power receiving unit at a current parking position of the vehicle in the parking area, determine whether the current parking position must be changed based on the calculated power receiving efficiency, and output information based on the determination to an output unit.

BRIEF DESCRIPTION OF THE DRAWINGS

FIG. 2 is a block diagram that illustrates the power reception guidance system;

FIGS. 3A and 3B are flowcharts of a power reception guidance process;

FIG. 4 is a drawing that illustrates a display that shows and outputs guidance information in the power reception guidance process.

FIG. 5 is a drawing that illustrates a display that shows and outputs guidance information in the power reception guidance process.

DETAILED DESCRIPTION OF EXEMPLARY IMPLEMENTATIONS

Hereinafter, examples of a guidance device for power reception, a guidance method for power reception, and a guidance program for power reception according to the broad inventive principles described herein will be described in detail with reference to the drawings.

I. FIRST EXAMPLE

A first exemplary implementation of the broad inventive principles will be explained here. This example determines whether a parking position must be changed based on a comparison of the amount of received power during parking and the amount of required power that should be received.

A. Configuration

Figure 1:
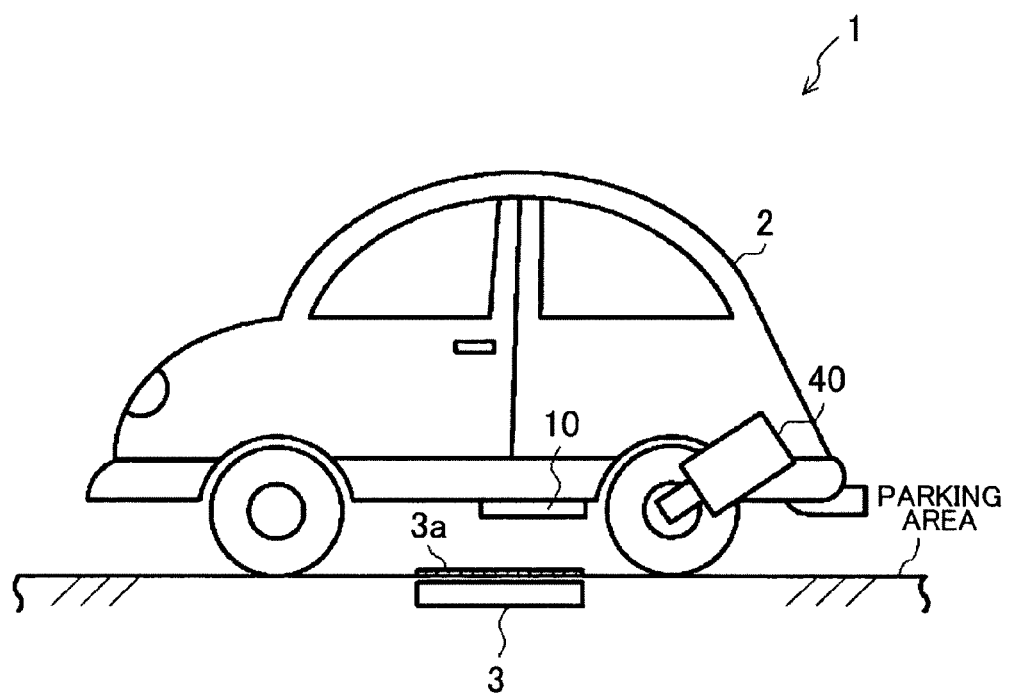
FIG. 1 is a schematic diagram that illustrates a power reception guidance system according to a first example.

FIG. 1 is a schematic diagram that illustrates a power reception guidance system according to the first example, and FIG. 2 is a block diagram that illustrates the power reception guidance system. A power reception guidance system 1 is mounted in a vehicle 2 (referred to below as a "host vehicle 2" as necessary), and provides guidance pertaining to non-contact power supply from a power supply unit installed in a parking area to a power receiving unit installed in the vehicle 2. The power reception guidance system 1 includes a power receiving unit 10, a battery charging unit 20, a battery 30, a camera 40, a current position detection processing unit 50, and a power reception guidance device 60.

Specific methods for achieving a non-contact power supply include utilizing the mutual induction that is generated between two coils, for example. According to this method, a high-frequency current can be applied to a primary coil on the power supply side to generates changes in the magnetic field. The changes in the magnetic field generate an induction current in a secondary coil on the power receiving side. The secondary coil can thus receive power from the primary coil. As shown in FIG. 1, in the first example, an example will be explained in which a power supply device 3 that includes a primary coil serving as the power supply unit is provided embedded in the surface of a parking area such as a parking lot.

The power receiving unit 10 receives a non-contact power supply from the power supply device 3 installed in the parking area, and supplies the received power to the battery 30 through the battery charging unit 20. The power receiving unit 10 may be structured using the secondary coil mentioned above, and is provided on a bottom surface of the vehicle 2, for example. Parking the vehicle 2 such that the power receiving unit 10 and the primary coil of the power supply device 3 oppose one another enables the power receiving unit 10 to receive power from the power supply device 3.

The battery charging unit 20 is a charging mechanism for charging the battery 30 with power supplied from the power receiving unit 10. The specific constitution of the battery charging unit 20 may take on any form, and the battery charging unit 20 may be formed using a commonly known charging control circuit equipped with overcharge, overdischarge, and overcurrent protection circuits and the like.

The battery 30 is a rechargeable battery that accumulates power supplied from the power receiving unit 10 through the battery charging unit 20. A commonly known rechargeable battery such as a lithium ion secondary battery or a nickel hydride secondary battery may be used as the battery 30.

The camera 40 is an imaging mechanism that takes images of the area around the vehicle 2. As the example in FIG. 1 shows, the camera 40 is arranged facing downward of the vehicle 2 so as to enable imaging of a marker 3a that is provided inside the parking area to indicate the embedded location of the power supply device 3. The camera 40 may also be used in combination as a commonly known backup camera or side mirror camera. The image data acquired by the camera 40 is output to the power reception guidance device 60. Note that the specific constitution of the camera 40 may take on any form, and the camera 40 may be formed using a commonly known imaging element such as a CMOS image sensor or a CCD image sensor, and commonly known optical components such as a fish-eye lens or a prism.

The current position detection processing unit 50 detects the current position of the vehicle 2 installed with the power reception guidance device 60. Specifically, the current position detection processing unit 50 has at least one of a GPS, a geomagnetic sensor, a distance sensor, and a gyroscopic sensor (none of which are shown in the drawings), and detects the current position (coordinates), heading, and the like of the vehicle 2 using a commonly known method.

The power reception guidance device 60 provides guidance pertaining to a non-contact power supply from the power supply device 3 installed in the parking area to the power receiving unit 10 installed in the vehicle 2. The power reception guidance device 60 includes a magnetic sensor 61, a speaker 62, a display 63, a controller (e.g., control unit 64), and a data storage unit 65.

The magnetic sensor 61 is a field intensity detection unit that detects the intensity of the magnetic field in the power receiving unit 10. One or more magnetic sensors 61 may be disposed near the power receiving unit 10 or in corners of the vehicle 2. A commonly known coil, hall element, or the like may be used as the magnetic sensor 61.

The speaker 62 and the display 63 are output units that output various information based on controls of the control unit 64. Note that the specific voice output from the speaker 62 may take on any form, and it is possible to output a synthetic voice that is generated as necessary or a pre-recorded voice. Further note that the specific constitution of the display 63 may take on any form, and a flat panel display such as a commonly known liquid crystal display or organic EL display may be used.

The control unit 64 controls the power reception guidance device 60. Specifically, the control unit 64 is a computer with a configuration that includes a CPU, various programs that are interpreted and executed in the CPU (including OS and other basic control programs, and application programs that are activated in the OS to carry out specific functions), and an internal memory such as a RAM and/or ROM for storing the programs and various data. In particular, the power reception guidance program according to the present example may be stored in the RAM, ROM, and/or in the data storage unit 65, and may be executed by the control unit 64 to implement the functions of the various units 64a-64g.

The control unit 64 includes a positional relationship specifying unit 64a, a guidance control unit 64b, a determination unit 64c, a power receiving efficiency specifying unit 64d, a required power amount specifying unit 64e, an estimated parking time specifying unit 64f, and a route search unit 64g in terms of functional concept. The positional relationship specifying unit 64a specifies a positional relationship between the power supply device 3 and the power receiving unit 10. The guidance control unit 64b outputs information through the speaker 62 and the display 63. The determination unit 64c determines whether the parking position must be changed based on the power receiving efficiency specified by the power receiving efficiency specifying unit 64d. The power receiving efficiency specifying unit 64d specifies the efficiency of the power reception of the power receiving unit 10 at the parking position of the vehicle 2 in the parking area. The required power amount specifying unit 64e specifies the amount of required power that should be received by the power receiving unit. The estimated parking time specifying unit 64f specifies the estimated parking time of the vehicle 2. The route search unit 64g searches for a route from a departure point to a destination. A commonly known method used by a car navigation device may be adopted as the specific route search method of the route search unit 64g. The processes that are executed by these functional elements of the control unit 64 will be described in detail later.

The data storage unit 65 is a storage unit that stores programs and various data required for operation of the power reception guidance device 60, and has a configuration that uses a hard disk (not shown) as an external memory device, for example. However, any other storage mediums, including a magnetic storage medium such as a magnetic disk or an optical storage medium such as a DVD or BLU-RAY disc, can be used in place of or in combination with the hard disk.

The data storage unit 65 has a map information database 65a. (Note that database will be abbreviated to "DB" below.) The map information DB 65a is a map information storage unit that stores map information. The map information includes route data, map data, and facility data used by the route search unit 64g to search for a route, as well as power supply device information 65b and parking time information 65c.

The facility data among the map information is information for specifying a facility such as a restaurant, a shopping center, and a parking lot, and for specifying the facility name, type, position coordinates (e.g. peripheral and central coordinates of the facility), and the like.

The power supply device information 65b is information for specifying the installation location, performance, and the like of the power supply device 3. The power supply device information 65b is stored associated with each facility specified based on the facility data. In addition, the power supply device information 65b may include, for example, coordinate information for the position where the power supply device 3 is installed, and performance information specifying a maximum field intensity that can be generated by each power supply device 3, a maximum rate of change of the field intensity, or a maximum amount of power that can be received by the power receiving unit 10 from each power supply device 3 per unit time. In the power supply device information 65b, power receiving efficiency information for specifying the power receiving efficiency is associated with the positional relationship between the power supply device 3 and the power receiving unit 10 of the vehicle 2. The power receiving efficiency can thus be specified based on the positional relationship between the power supply device 3 and the power receiving unit 10 of the vehicle 2. Note that the positional relationship is a concept that includes, for example, the distance and angle between the coil central axes of the primary coil of the power supply device 3 and the secondary coil of the power receiving unit 10, or the distance between opposing faces of the power supply device 3 and the power receiving unit 10.

The parking time information 65c is information for specifying the estimated parking time in the parking lot. For example, an average parking time can be set for each type of facility such as restaurants and shopping centers (e.g. one hour for restaurants, two hours for shopping centers, etc.). For a facility that has been used in the past, the parking time may be specified as the amount of time between turning the ignition off and turning it on again at the facility. The parking time is then set as the parking time information 65c that corresponds to the facility.

B. Operation

Figure 3B:
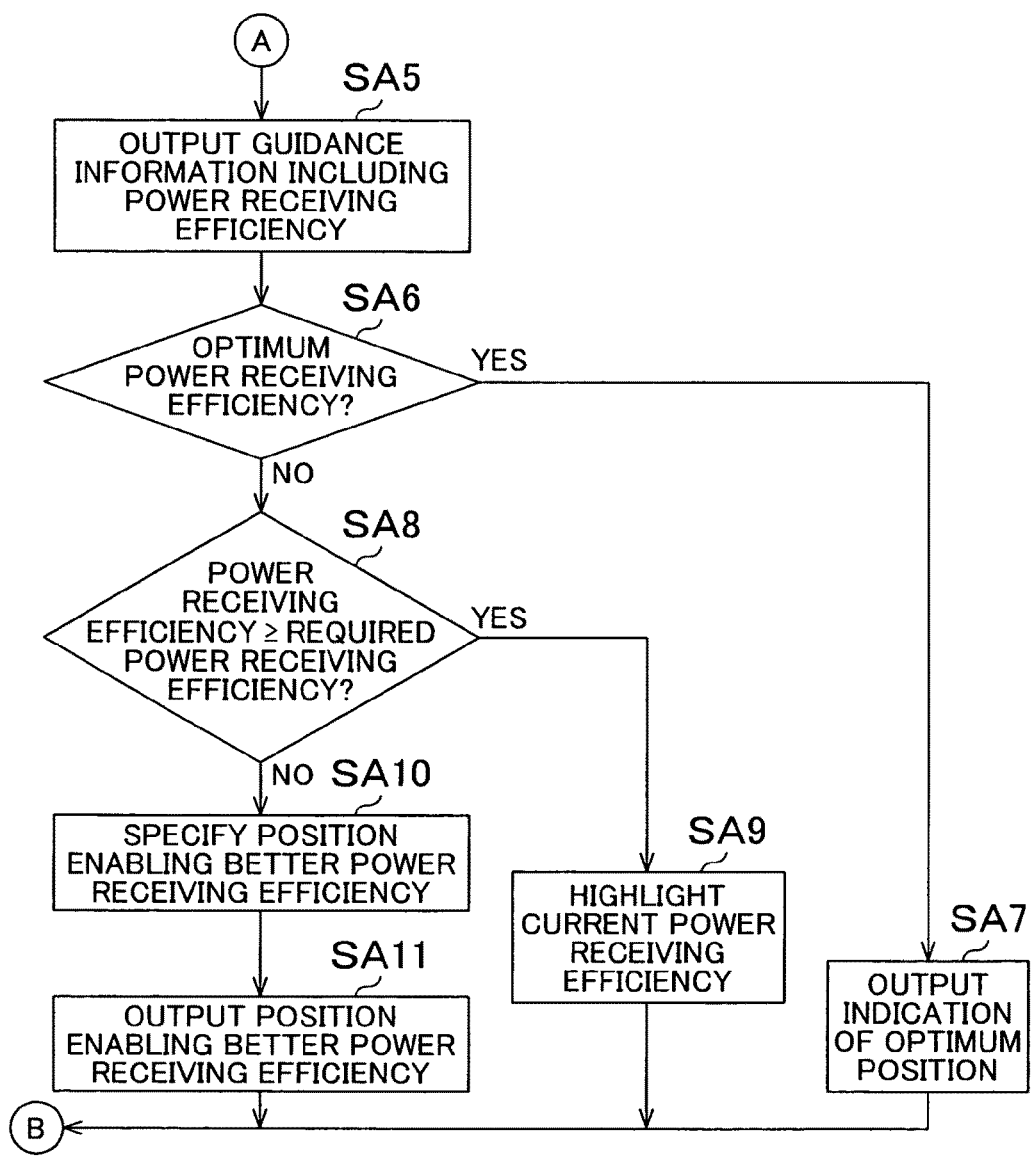

The power reception guidance process that may be executed by one or more components of the power reception guidance system 1 will be explained below. FIGS. 3A and 3B are flowcharts of the power reception guidance process (steps in the descriptions of each process below are abbreviated to "S"). The process may be implemented by the control unit 64 executing a computer program stored in the RAM, ROM, and/or the information storage unit 50. But, even though the exemplary structure of the above-described power reception guidance system 1 may be referenced in the description, it should be appreciated that the structure is exemplary and the process need not be limited by any of the exemplary structure.

The power reception guidance process is repeatedly activated at a predetermined cycle after the power reception guidance system 1 is powered on, when a parking trigger indicating that the host vehicle 2 has started the parking operation in a parking area such as a parking lot is turned on, for example. The parking trigger is determined as on, for example, if the shift position of the host vehicle 2 is detected as changed to reverse based on a detection value from a shift position sensor (not shown), or if an operational input representing the start of the parking operation has been made through an operation switch (not shown).

Following activation of the power reception guidance process, the guidance control unit 64b acquires the host vehicle position through the current position detection processing unit 50 (SA1), and determines whether power can be received in the vicinity of the acquired host vehicle position (SA2). For example, based on the host vehicle position and the facility data of the map information DB 65a, the facility entered by the host vehicle 2 is specified and the power supply device information 65b associated with the facility referenced. It is determined that power can be received if there is a power supply device 3 installed in the parking area; and it is determined that power cannot be received if there is no power supply device 3 installed in the parking area.

Consequently, if it is determined that power cannot be received because there is no power supply device 3 installed in the parking area entered by the host vehicle 2 (NO at SA2), the guidance control unit 64b ends the power reception guidance process. At such time, guidance information indicating that power cannot be received may be output by the speaker 62 or the display 63.

However, if it is determined that power can be received because the power supply device 3 is installed in the parking area entered by the host vehicle 2 (YES at SA2), the power receiving efficiency specifying unit 64d specifies the power receiving efficiency of the power receiving unit 10 at the current position of the host vehicle 2 (SA3). To specify the power receiving efficiency, the power receiving efficiency specifying unit 64d uses the magnetic sensor 61 to detect the field intensity of the power receiving unit 10. In addition, based on the power supply device information 65b stored in the map information DB 65a, the power receiving efficiency specifying unit 64d specifies the maximum field intensity that can be generated at the position of the power receiving unit 10 of the vehicle 2 parked at a suitable position by the power supply device 3 installed in the parking area entered by the host vehicle 2. The power receiving efficiency can then be specified based on a comparison of the field intensity detected by the magnetic sensor 61 and the maximum field intensity specified based on the power supply device information 65b. Specifically, the power receiving efficiency can be specified as a percentage according to the following Equation 1:

$$\frac{P}{P\max} \times 100 \qquad [1]$$

where P is the field intensity detected by the magnetic sensor 61 and Pmax is the maximum field intensity specified from the power supply device information 65b.

There is an alternative way to specify the power receiving efficiency: the positional relationship specifying unit 64a can specify the positional relationship between the power supply device 3 and the power receiving unit 10; and then based on the positional relationship specified by the positional relationship specifying unit 64a and the power receiving efficiency information stored in the map information DB 65a, the power receiving efficiency specifying unit 64d can specify the power receiving efficiency. Note that the method used by the positional relationship specifying unit 64a for specifying the positional relationship may take on any form. For example, image data input from the camera 40 to the power reception guidance device 60 may be analyzed by the positional relationship specifying unit 64a. If the marker 3a for indicating the embedded location of the power supply device 3 is recognized among the image data, the positional relationship specifying unit 64a can specify the positional relationship between the power supply device 3 and the power receiving unit 10 based on information such as the installation location and orientation of the camera 40 on the host vehicle 2, and the installation location of the power receiving unit 10. Alternatively, based on the field intensity detected by the magnetic sensor 61 installed at a plurality of locations in the vehicle 2, the peak position of the field intensity can be estimated, and the positional relationship between the power receiving unit 10 and the power supply device 3 specified by the positional relationship specifying unit 64a using the peak position as the coil center of the primary coil of the power supply device 3.

Next, the guidance control unit 64b determines whether the host vehicle 2 has completed the parking operation (SA4). The guidance control unit 64b may determine the host vehicle 2 has completed the parking operation based on whether the parking brake has been used (i.e., determine the parking operation is complete when the side brake is used), the position of the shift lever (i.e., determine the parking operation is complete when the shift lever is placed in the park position), or the on/off state of the engine (i.e., determine the parking operation is complete when the engine is off).

Figure 6:
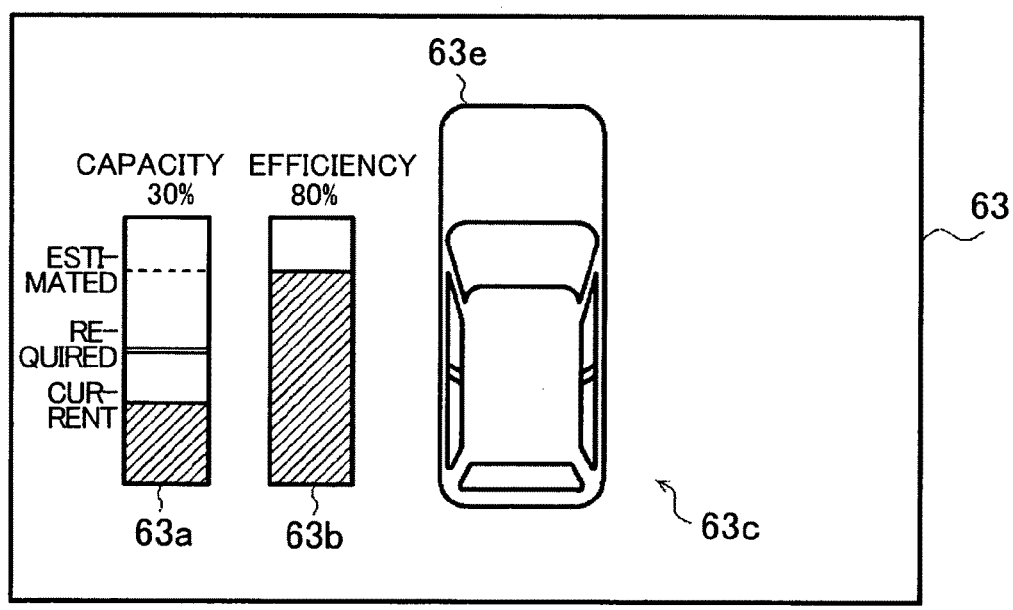
FIG. 6 is a drawing that illustrates a display that shows and outputs guidance information in the power reception guidance process.

If it is determined that the host vehicle 2 has not completed the parking operation (NO at SA4), the guidance control unit 64*b* outputs guidance information that includes the power receiving efficiency specified by the power receiving efficiency specifying unit 64*d* at SA3 through the speaker 62 or the display 63 (SA5). FIGS. 4 to 6 are drawings that illustrate examples of the display 63 showing and outputting guidance information in the power reception guidance process. In FIGS. 4 and 5, the power receiving efficiency is less than a required efficiency. FIG. 6 shows an example of the display 63 when the power receiving amount is equal to or greater than a required amount after the parking operation is completed. In the examples shown in FIGS. 4 to 6, a bar graph 63*a* that represents the remaining capacity of the battery 30, a bar graph 63*b* that represents the power receiving efficiency of the power receiving unit 10, and a plane view 63*c* that indicates the positional relationship between the power supply device 3 and the power receiving unit 10 are shown on the display 63. Among these, the bar graph 63*b* that represents the power receiving efficiency of the power receiving unit 10 provides guidance regarding the power receiving efficiency at the current position of the host vehicle 2.

Next, the guidance control unit 64*b* determines whether the power receiving efficiency specified by the power receiving efficiency specifying unit 64*d* at SA3 is an optimum power receiving efficiency (SA6). For example, a threshold (e.g. 90%) may be used as a standard for judging whether the power receiving efficiency specified is the optimum power receiving efficiency, and stored in advance in the data storage unit 65. If the power receiving efficiency specified by the power receiving efficiency specifying unit 64*d* is equal to or greater than the threshold, the power receiving efficiency specified is determined to be the optimum power receiving efficiency; if less than the threshold, the power receiving efficiency specified is determined not to be the optimum power receiving efficiency.

If it is determined that the power receiving efficiency specified by the power receiving efficiency specifying unit 64*d* is the optimum power receiving efficiency (YES at SA6), the guidance control unit 64*b* outputs through the speaker 62 or the display 63 information indicating that the current position of the host vehicle 2 is the optimum position for receiving power (SA7).

However, if it is determined that the power receiving efficiency specified by the power receiving efficiency specifying unit 64*d* is not the optimum power receiving efficiency (NO at SA6), the guidance control unit 64*b* determines whether the power receiving efficiency specified by the power receiving efficiency specifying unit 64*d* is equal to or greater than a required power receiving efficiency (SA8). For example, a minimum required power receiving efficiency (e.g. 50%) for charging the battery 30 may be stored in advance in the data storage unit 65, and the minimum required power receiving efficiency used as a standard for the determination made by the guidance control unit 64*b*.

Consequently, if it is determined that the power receiving efficiency specified by the power receiving efficiency specifying unit 64*d* is equal to or greater than the required power receiving efficiency (YES at SA8), the guidance control unit 64*b* highlights the current power receiving efficiency shown on the display 63 (SA9). For example, the font of the numerals indicating the power receiving efficiency may be bolded, or the display color of the bar graph 63*b* changed. The power receiving efficiency at the current position of the host vehicle 2 satisfying the minimum required power receiving efficiency can thus be communicated.

However, if it is determined that the power receiving efficiency specified by the power receiving efficiency specifying unit 64*d* is not equal to or greater than the required power receiving efficiency (is less than the required power receiving efficiency) (NO at SA8), the power receiving efficiency specifying unit 64*d* specifies a position with better efficiency that can increase the power receiving efficiency based on the positional relationship between the power supply device 3 and the power receiving unit 10 as specified by the positional relationship specifying unit 64*a* (SA10). For example, based on the positional relationship between the power supply device 3 and the power receiving unit 10 as specified by the positional relationship specifying unit 64*a* at SA3, the power receiving efficiency specifying unit 64*d* specifies a vehicle position at which the coil central axes of the primary coil of the power supply device 3 and the secondary coil of the power receiving unit 10 mutually coincide as the position with better efficiency. Alternatively, any vehicle position on a straight line that links the coil central axes of the primary coil of the power supply device 3 and the secondary coil of the power receiving unit 10 may be specified as the position with better efficiency.

The guidance control unit 64*b* subsequently outputs guidance information that includes the position with better efficiency specified by the power receiving efficiency specifying unit 64*d* through the speaker 62 or the display 63 (SA11). As shown in FIG. 4 for example, a guide rectangle 63*d* that represents the position with better efficiency as specified at SA10 and a host vehicle marker 63*e* that represents the current position of the host vehicle are shown on the display 63. By moving the host vehicle 2 such that the guide rectangle 63*d* and the host vehicle marker 63*e* coincide, it is possible to locate the power receiving unit 10 on the position with better efficiency. Alternatively, as shown in FIG. 5 for example, a power supply device marker 63*f* that represents the position of the power supply device 3 and a power receiving unit marker 63*g* that represents the position of the power receiving unit 10 are shown on the display 63. By moving the host vehicle 2 such that the power supply device marker 63*f* and the power receiving unit marker 63*g* coincide, it is possible to locate the power receiving unit 10 on the position with better efficiency. As shown in FIGS. 4 and 5, showing an arrow 63*h* that points in the direction of the position with better efficiency from the current position of the host vehicle 2 on the display 63 also provides guidance as to the direction in which the host vehicle 2 should be moved in order to increase the power receiving efficiency. Guidance can also be provided regarding the required distance to move the host vehicle 2 to the position with better efficiency (e.g. forward 20 cm and right 30 cm).

Meanwhile, if it is determined at SA4 that the host vehicle 2 has completed the parking operation (YES at SA4), the required power amount specifying unit 64*e* acquires route information that specifies a route, which was searched for in advance by the route search unit 64*g*, from the parking position of the host vehicle 2 to the next destination (SA12). Here, the next destination means a destination that the host vehicle 2 will head toward after leaving the parking position.

Next, the required power amount specifying unit 64*e* specifies the amount of required power that should be received by the power receiving unit 10, and the estimated parking time specifying unit 64*f* specifies the estimated parking time of the host vehicle 2 (SA13). For example, power amount information pertaining to the average amount of power required for traveling each road may be stored in advance in the map information DB 65a. Based on the power amount information, the required power amount specifying unit 64e then calculates the power amount required for traveling the route specified based on the route information acquired SA12. The required power amount specifying unit 64e also specifies the current remaining amount of power in the battery 30 of the host vehicle 2, and finds the difference between this remaining amount and the power amount required for traveling the route specified based on the route information acquired at SA12. Thus, the required power amount specifying unit 64e can specify the amount of required power that should be received by the power receiving unit 10 in order for the host vehicle 2 to reach the next destination. In addition, the estimated parking time specifying unit 64f can specify the estimated parking time at the parking position by acquiring from the map information DB 65a the parking time information 65c that is set associated with the facility type corresponding to the parking position of the host vehicle 2.

The determination unit 64c subsequently specifies the amount of power to be received by the power receiving unit 10 while the host vehicle 2 is parked, based on the power receiving efficiency specified by the power receiving efficiency specifying unit 64d at SA3 and the estimated parking time specified by the estimated parking time specifying unit 64f at SA13 (SA14). For example, based on the power supply device information 65b acquired from the data storage unit 65, the determination unit 64c specifies the maximum amount of power that can be received by the power receiving unit 10 from the power supply device 3 per unit time. The determination unit 64c then calculates the amount of power that can be received per unit time from the maximum power receiving amount and the power receiving efficiency. By multiplying the amount of power that can be received per unit time by the estimated parking time, it is possible to specify the amount of power to be received by the power receiving unit 10 while parked.

Based on the power receiving amount specified at SA14 and the required power amount specified by the required power amount specifying unit 64e at SA13, the determination unit 64c then determines whether the parking position must be changed (SA15). For example, if the power receiving amount specified at SA14 is equal to or greater than the required power amount, the determination unit 64c determines that the necessary power receiving amount can be received while the host vehicle 2 is parked, and that there is no need to change the parking position. However, if the power receiving amount specified at SA14 is less than the required power amount, the determination unit 64c determines that the necessary power receiving amount cannot be received while the host vehicle 2 is parked, and that the parking position must be changed.

Consequently, if it is determined that the parking position need not be changed (NO at SA15), the guidance control unit 64b outputs guidance information that includes the power receiving amount specified at SA14 through the speaker 62 or the display 63 (SA16). As shown in the example of FIG. 6, the bar graph 63a representing the remaining capacity of the battery 30 shows lines that specify the current remaining capacity ("current"), the remaining capacity when the necessary power receiving amount is received ("required"), and the amount of power to be received by the power receiving unit 10 while the host vehicle 2 is parked ("estimated"). Guidance can thus be provided indicating that the required power amount can be received.

However, if it is determined that the parking position must be changed (YES at SA15), the power receiving efficiency specifying unit 64d specifies a position with a better power receiving amount that can increase the amount of power received based on the positional relationship between the power supply device 3 and the power receiving unit 10 as specified by the positional relationship specifying unit 64a (SA17). For example, the power receiving efficiency specifying unit 64d may specify the position with better efficiency as in the process at SA10 and then specify the position with better efficiency as the position with a better power receiving amount. The guidance control unit 64b subsequently outputs guidance information that includes the position with the better power receiving amount specified by the power receiving efficiency specifying unit 64d through the speaker 62 or the display 63 (SA18). For example, similar to the process at SA11, the guidance control unit 64b may show the guide rectangle 63d that represents the position with a better power receiving amount and the host vehicle marker 63e that represents the current position of the host vehicle on the display 63 (FIG. 4); or show the power supply device marker 63f that represents the position of the power supply device 3 and the power receiving unit marker 63g that represents the position of the power receiving unit 10 in the host vehicle 2 on the display 63 (FIG. 5); or show the arrow 63h that points in the direction of the position with better efficiency from the current position of the host vehicle 2 on the display 63 (FIGS. 4 and 5). Note that after the process at SA18, the power receiving efficiency specifying unit 64d determines whether the host vehicle 2 is located at the position with the better power receiving amount. If the host vehicle 2 is located at the position with the better power receiving amount, this may also be output through the speaker 62 or the display 63. Moving of the host vehicle 2 to a position that enables a better power receiving amount can thus be communicated.

After the process at SA7, SA9, SA11, SA16, or SA18, the power reception guidance system 1 ends the power reception guidance process.

C. Effect

According to the first example as described above, information pertaining to the power receiving efficiency specified by the power receiving efficiency specifying unit 64d is output by the speaker 62 or the display 63. Therefore, guidance can be provided regarding information to be used as a standard for judging how suitable the current position of the vehicle 2 is for charging.

The power receiving efficiency specifying unit 64d can also specify the power receiving efficiency based on a comparison of the field intensity detected by the magnetic sensor 61 and the maximum field intensity generated by the power supply device 3.

The power receiving efficiency specifying unit 64d can also specify the power receiving efficiency based on the positional relationship between the power supply device 3 and the power receiving unit 10 as specified by the positional relationship specifying unit 64a.

The speaker 62 and the display 63 output information pertaining to the position with better efficiency specified by the power receiving efficiency specifying unit 64d. Therefore, guidance can be provided regarding the target position and the direction in which the vehicle 2 should be moved in order to increase the power receiving efficiency.

The power receiving efficiency specifying unit 64d determines whether the vehicle 2 is located at the position with better efficiency, and outputs information based on the determination result through the speaker 62 or the display 63.

Therefore, moving of the vehicle 2 to a position that enables a better power receiving amount can be communicated.

It is also determined whether the parking position must be changed based on the power receiving efficiency specified by the power receiving efficiency specifying unit 64d, and information based on the determination result is output through the speaker 62 or the display 63. Therefore, guidance can be provided regarding the necessity of changing the parking position.

The determination unit 64c determines whether the parking position must be changed based on the amount of power received by the power receiving unit 10 while the vehicle 2 is parked and the required power amount specified by the required power amount specifying unit 64e. The guidance control unit 64b then outputs information based on the determination result through the speaker 62 or the display 63. Therefore, guidance can be provided regarding information to be used as a standard for judging how suitable the current position of the vehicle 2 is for receiving the necessary power receiving amount. Furthermore, guidance can be provided that is based on how suitable the parking position of the vehicle 2 is for receiving the necessary power receiving amount.

The required power amount is specified based on the route information specifying the route from the parking position to the next destination, so that the required power amount can be specified with greater accuracy.

II. SECOND EXAMPLE

A second exemplary implementation of the broad inventive principles will be explained here. This example determines whether the parking position must be changed based on a comparison of the power receiving efficiency at the parking position and a required efficiency. The configuration of the second example is generally identical to the configuration of the first example unless otherwise noted. For configurations generally identical to the configuration of the first example, the same reference symbols and/or names as used in the first example are assigned as necessary and accompanying explanations are omitted.

A. Operation

Figure 7A:
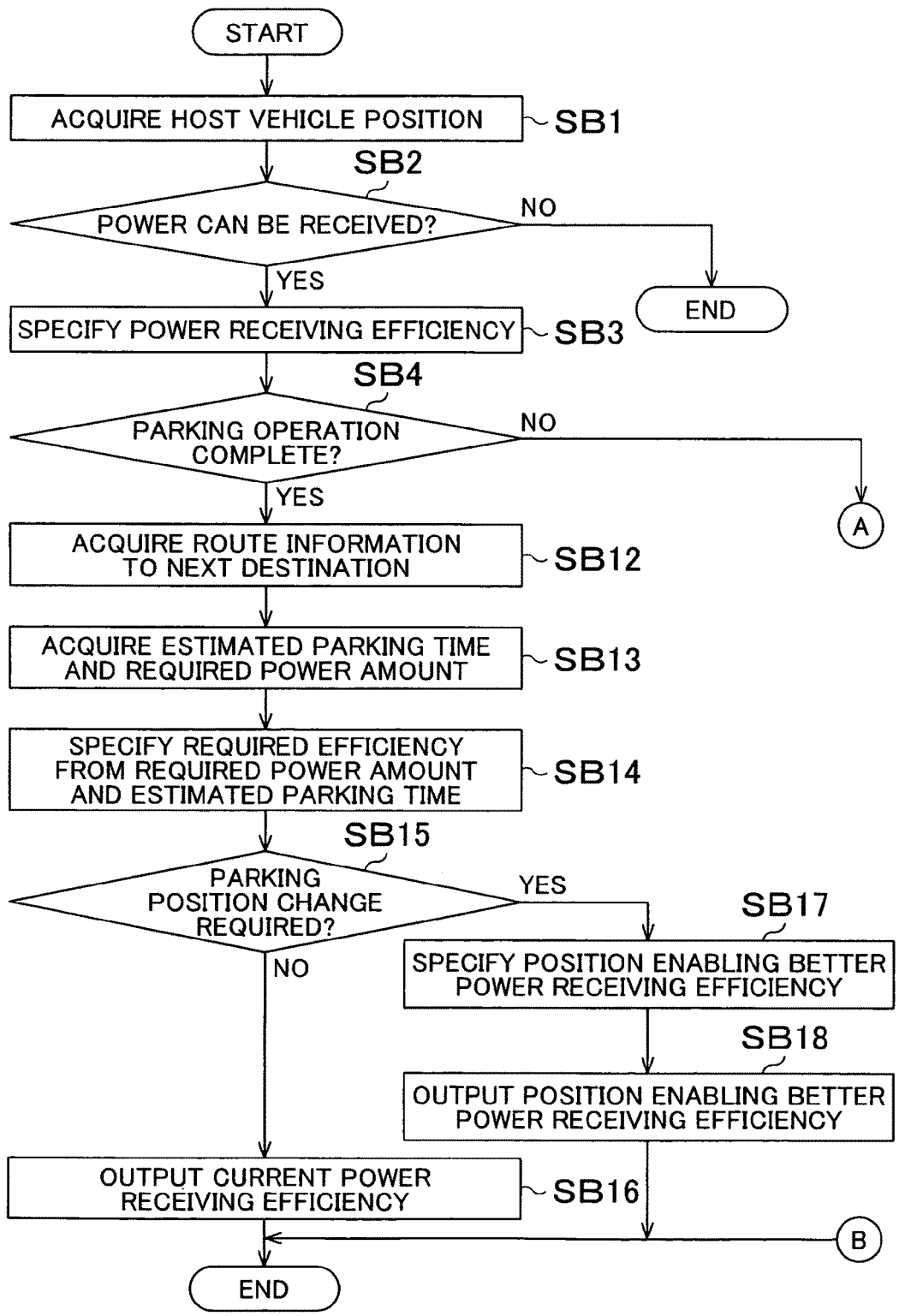
FIGS. 7A and 7B are flowcharts of the power reception guidance process.
Figure 7B:
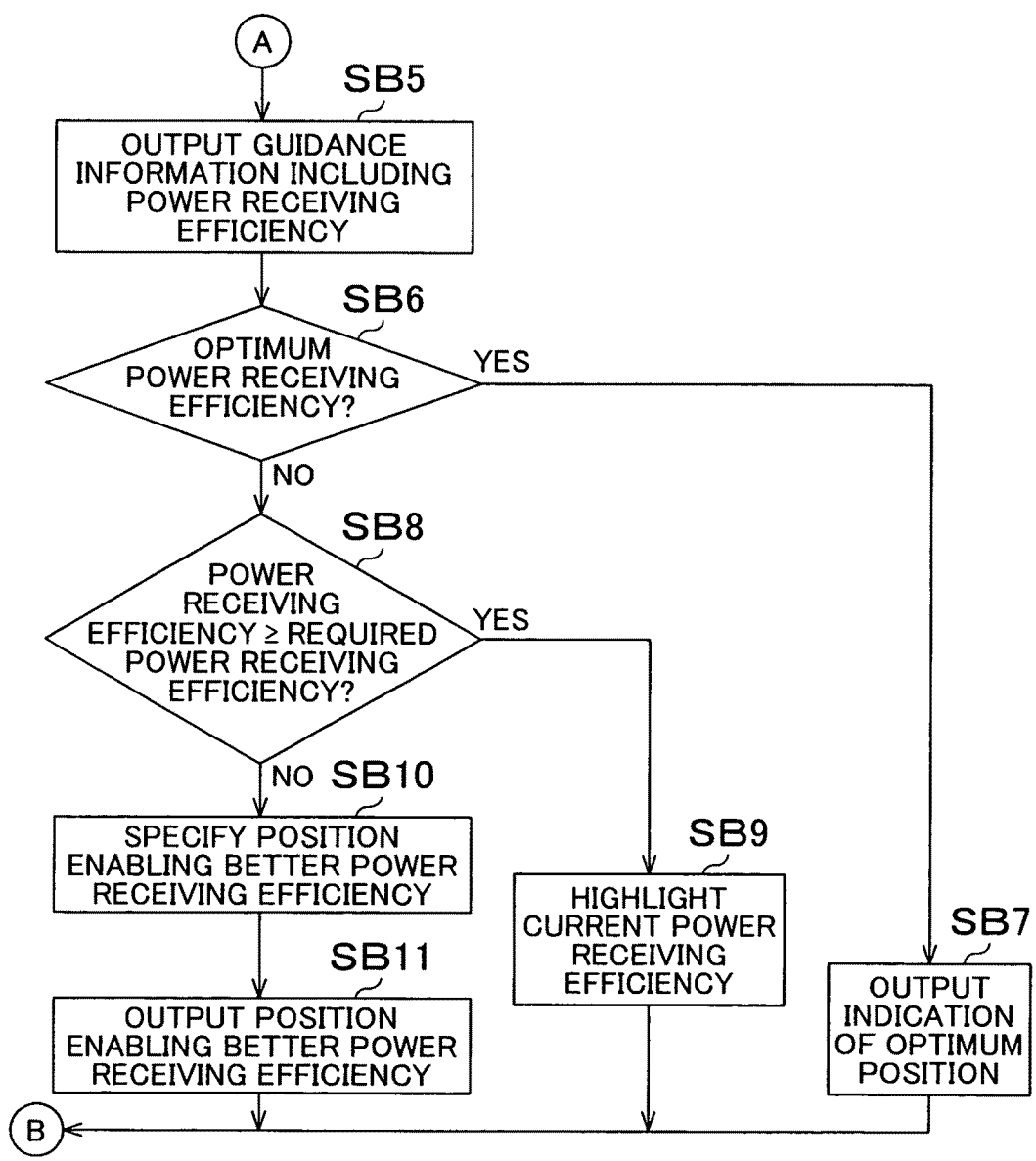

A second exemplary power reception guidance process that may be executed by one or more components of the power reception guidance system 1 will be explained below. FIGS. 7A and 7B are flowcharts of the second example of the power reception guidance process (steps in the descriptions of each process below are abbreviated to "S"). The process may be implemented by the control unit 64 executing a computer program stored in the RAM, ROM, and/or the information storage unit 50. But, even though the exemplary structure of the above-described power reception guidance system 1 may be referenced in the description, it should be appreciated that the structure is exemplary and the process need not be limited by any of the exemplary structure. Note that the process content at SB1 to SB13 in the power reception guidance process of the second example is identical to the process content at SA1 to SA13 in the power reception guidance process explained in the first example, and will be omitted here.

After specifying the amount of required power that should be received and the estimated parking time at SB13, the determination unit 64c specifies a required efficiency, namely a power receiving efficiency necessary for receiving power while the host vehicle 2 is parked, based on the specified required power amount and the estimated parking time (SB14). For example, the determination unit 64c divides the required power amount by the estimated parking time in order to calculate the power receiving amount required per unit time when receiving power while parked. Furthermore, based on the power supply device information 65b acquired from the data storage unit 65, the determination unit 64c specifies the maximum amount of power that can be received by the power receiving unit 10 from the power supply device 3 per unit time. The determination unit 64c then divides the power receiving amount required per unit time by the specified maximum power receiving amount per unit time to specify the required efficiency, namely the power receiving efficiency necessary for receiving power while parked.

Based on the required efficiency specified at SB14 and the power receiving efficiency specified by the power receiving efficiency specifying unit 64d at SB3, the determination unit 64c then determines whether the parking position must be changed (SB15). For example, if the power receiving efficiency is equal to or greater than the required efficiency, the determination unit 64c determines that power can be received at the required power receiving efficiency while the host vehicle 2 is parked, and that there is no need to change the parking position. However, if the power receiving efficiency is less than the required efficiency, the determination unit 64c determines that power cannot be received at the required power receiving efficiency while the host vehicle 2 is parked, and that the parking position must be changed.

Consequently, if it is determined that the parking position need not be changed (NO at SB15), the guidance control unit 64b outputs guidance information that includes the power receiving efficiency specified at SB3 through the speaker 62 or the display 63 (SB16).

However, if it is determined that the parking position must be changed (YES at SB15), the power receiving efficiency specifying unit 64d specifies a position with better efficiency that can increase the power receiving efficiency based on the positional relationship between the power supply device 3 and the power receiving unit 10 as specified by the positional relationship specifying unit 64a (SB17). For example, the power receiving efficiency specifying unit 64d may specify the position with better efficiency as in the process at SB10. The guidance control unit 64b subsequently outputs guidance information that includes the position with better efficiency specified by the power receiving efficiency specifying unit 64d through the speaker 62 or the display 63 (SB18).

B. Effect

According to the second example as described above, in addition to the fundamental effects of the first example, the determination unit 64c determines whether the parking position must be changed based on the power receiving efficiency specified by the power receiving efficiency specifying unit 64d and the required efficiency. The guidance control unit 64b then outputs information based on the determination result through the speaker 62 or the display 63. Therefore, guidance can be provided regarding information to be used as a standard for judging how suitable the current position of the vehicle 2 is for receiving power at the required power receiving efficiency. Furthermore, guidance can be provided that is based on how suitable the parking position of the vehicle 2 is for receiving power at the required power receiving efficiency.

The required efficiency is specified based on the required power amount specified by the required power amount specifying unit 64e and the estimated parking time specified by the estimated parking time specifying unit 64f. Therefore, it is possible to specify the power receiving efficiency necessary for receiving the required power amount while parked.

III. THIRD EXAMPLE

A third exemplary implementation of the broad inventive principles will be explained here. This example determines whether the parking position must be changed based on a power receiving time necessary for receiving power and the estimated parking time. The configuration of the third example is generally identical to the configuration of the first example unless otherwise noted. For configurations generally identical to the configuration of the first example, the same reference symbols and/or names as used in the first example are assigned as necessary and accompanying explanations are omitted.

A. Operation

Figure 8A:
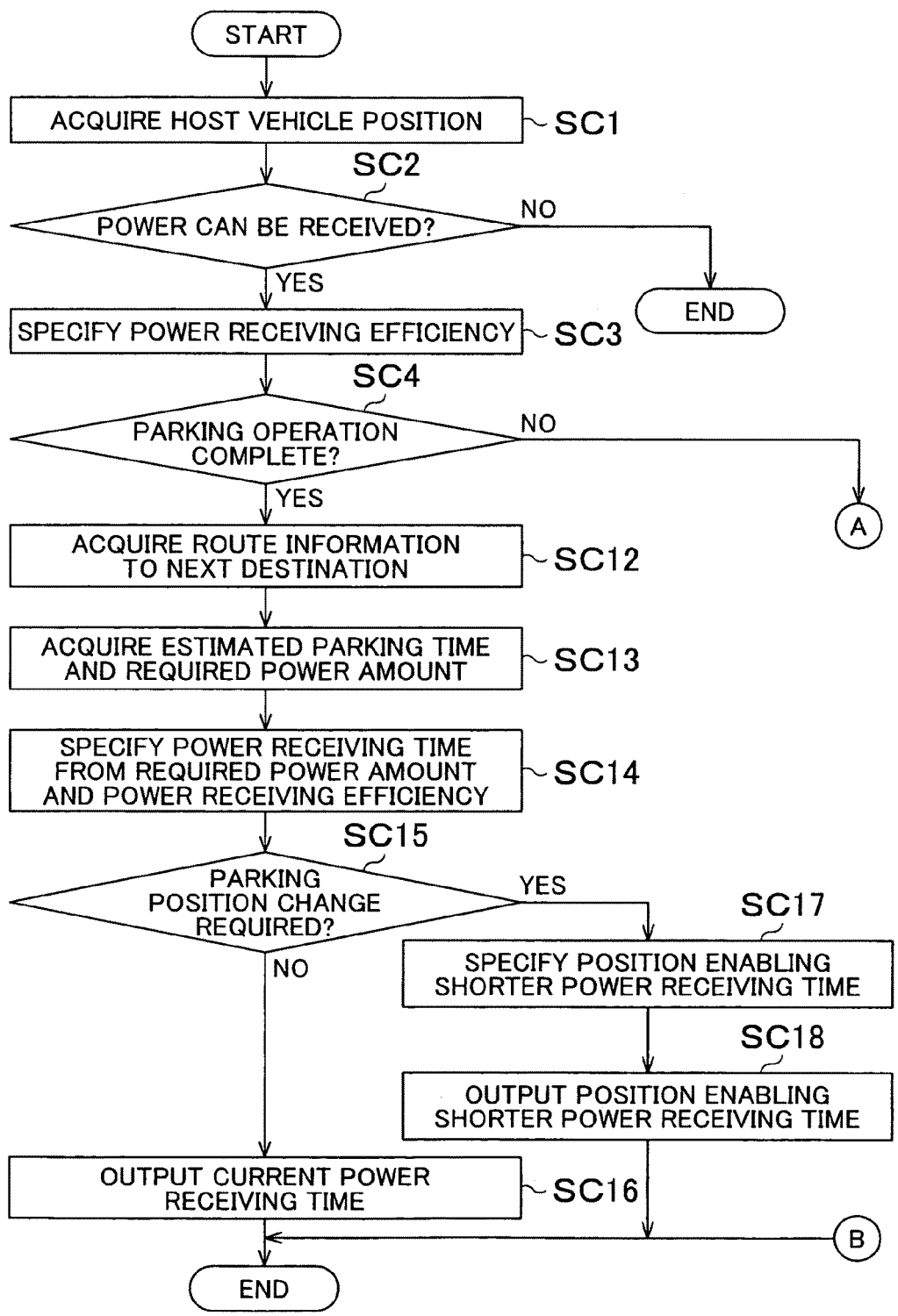
FIGS. 8A and 8B are flowcharts of the power reception guidance process.
Figure 8B:
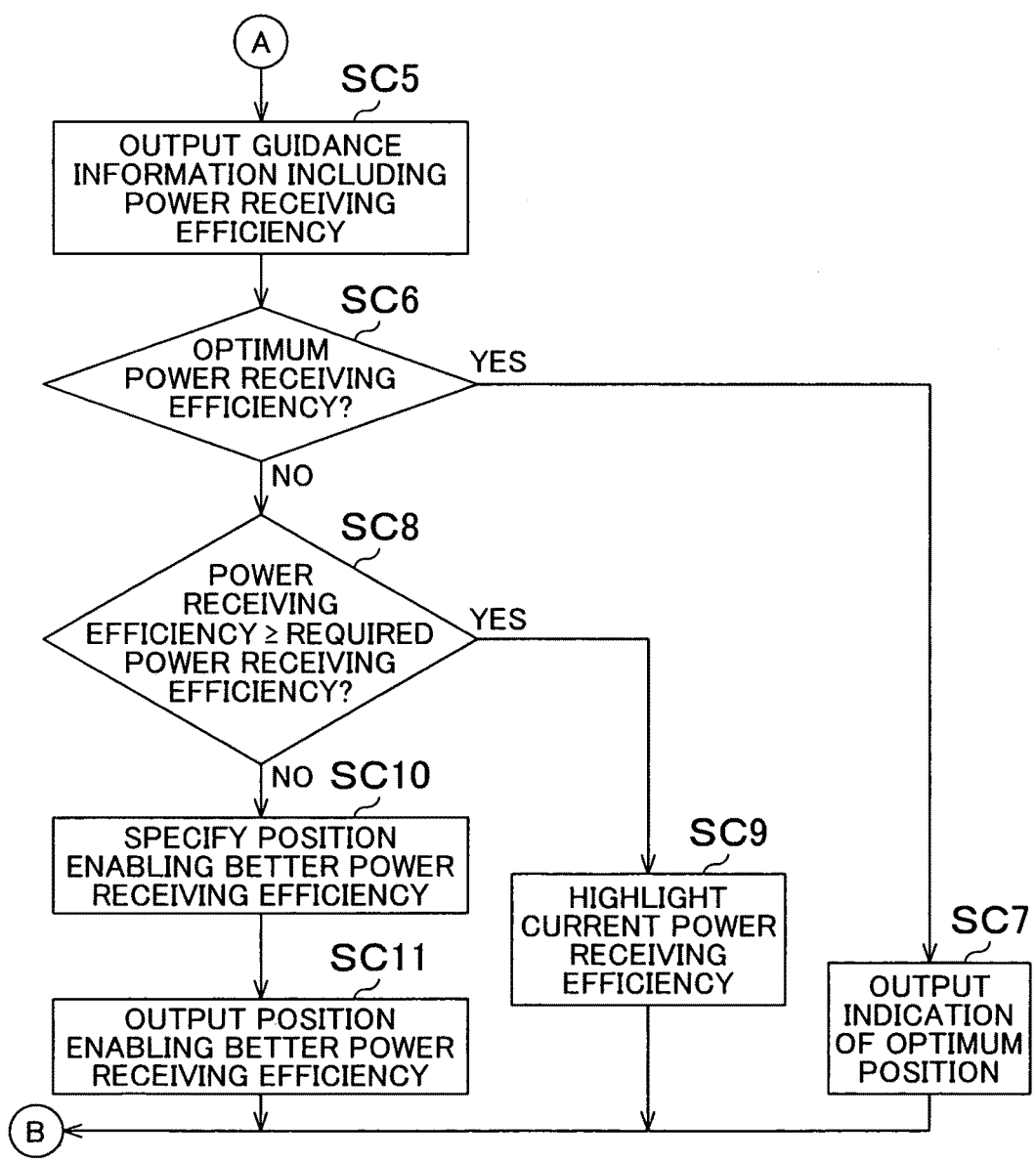

A third exemplary power reception guidance process that may be executed by one or more components of the power reception guidance system 1 will be explained below. FIGS. 8A and 8B are flowcharts of the third example of the power reception guidance process (steps in the descriptions of each process below are abbreviated to "S"). The process may be implemented by the control unit 64 executing a computer program stored in the RAM, ROM, and/or the information storage unit 50. But, even though the exemplary structure of the above-described power reception guidance system 1 may be referenced in the description, it should be appreciated that the structure is exemplary and the process need not be limited by any of the exemplary structure. Note that the process content at SC1 to SC13 in the power reception guidance process of the third example is identical to the process content at SA1 to SA13 in the power reception guidance process explained in the first example, and will be omitted here.

After specifying the amount of required power that should be received and the estimated parking time at SC13, the determination unit 64c specifies a power receiving time necessary for the power reception of the power receiving unit 10, based on the specified required power amount and the power receiving efficiency specified by the power receiving efficiency specifying unit 64d at SC3 (SC14). For example, based on the power supply device information 65b acquired from the data storage unit 65, the determination unit 64c specifies the maximum amount of power that can be received by the power receiving unit 10 from the power supply device 3 per unit time. The determination unit 64c then calculates the amount of power that can be received per unit time from the maximum power receiving amount and the power receiving efficiency. The power receiving time necessary for receiving power can be specified by dividing the required power amount by the receivable power amount per unit time.

Based on the power receiving time specified at SC14 and the estimated parking time specified by the estimated parking time specifying unit 64f at SC13, the determination unit 64c then determines whether the parking position must be changed (SC15). For example, if the power receiving time is equal to or less than the estimated parking time, the determination unit 64c determines that the completion of power reception is possible within the time that the host vehicle 2 is parked, and that there is no need to change the parking position. However, if the power receiving time is greater than the estimated parking time, the determination unit 64c determines that the completion of power reception is not possible within the time that the host vehicle 2 is parked, and that the parking position must be changed.

Consequently, if it is determined that the parking position need not be changed (NO at SC15), the guidance control unit 64b outputs guidance information that includes the power receiving time specified at SC14 through the speaker 62 or the display 63 (SC16). For example, the estimated parking time and the remaining time until the completion of power reception may be shown on the display 63. Guidance can thus be provided indicating the completion of power reception within the estimated parking time. The required time for full charging of the battery 30 may also be shown on the display 63. Guidance can thus be provided regarding information necessary for judging whether to continue receiving power until the battery 30 is fully charged.

However, if it is determined that the parking position must be changed (YES at SC15), the power receiving efficiency specifying unit 64d specifies a position with a shorter power receiving time that can cut the time for power reception based on the positional relationship between the power supply device 3 and the power receiving unit 10 as specified by the positional relationship specifying unit 64a (SC17). For example, the power receiving efficiency specifying unit 64d may specify the position with better efficiency as in the process at SC10 and then specify the position with better efficiency as the position with a shorter power receiving time. The guidance control unit 64b subsequently outputs guidance information that includes the position with the shorter power receiving time specified by the power receiving efficiency specifying unit 64d through the speaker 62 or the display 63 (SC18).

B. Effect

According to the third example as described above, in addition to the fundamental effects of the first example, the determination unit 64c determines whether the parking position must be changed based on the power receiving time necessary for the power reception of the power receiving unit 10 and the estimated parking time specified by the estimated parking time specifying unit 64f. The guidance control unit 64b then outputs information based on the determination result through the speaker 62 or the display 63. Therefore, guidance can be provided regarding information to be used as a standard for judging how suitable the current position of the vehicle 2 is for completing power reception within the estimated parking time. Furthermore, guidance can be provided that is based on how suitable the parking position of the vehicle 2 is for completing power reception within the estimated parking time.

IV. FOURTH EXAMPLE

A fourth exemplary implementation of the broad inventive principles will be explained here. This example determines whether a parking position must be changed to another parking position when a plurality of power supply devices 3 are installed in the parking area, based on a comparison of a receivable power amount that can be received from each power supply device 3 and the amount of required power that should be received. The configuration of the fourth example is generally identical to the configuration of the first example unless otherwise noted. For configurations generally identical to the configuration of the first example, the same reference symbols and/or names as used in the first example are assigned as necessary and accompanying explanations are omitted.

A. Operation

Figure 9:
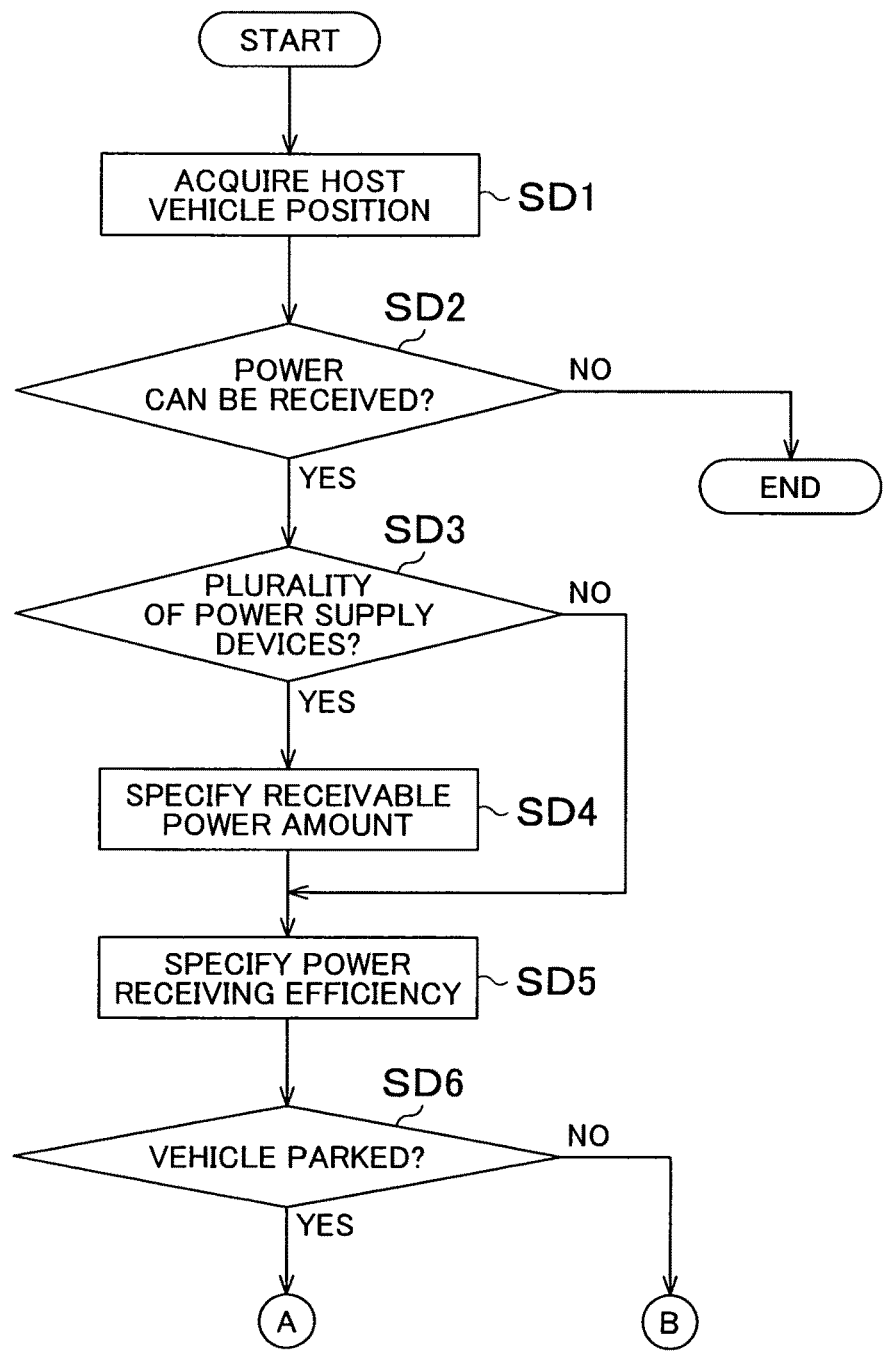
FIG. 9 is a flowchart of the power reception guidance process.
Figure 10A:
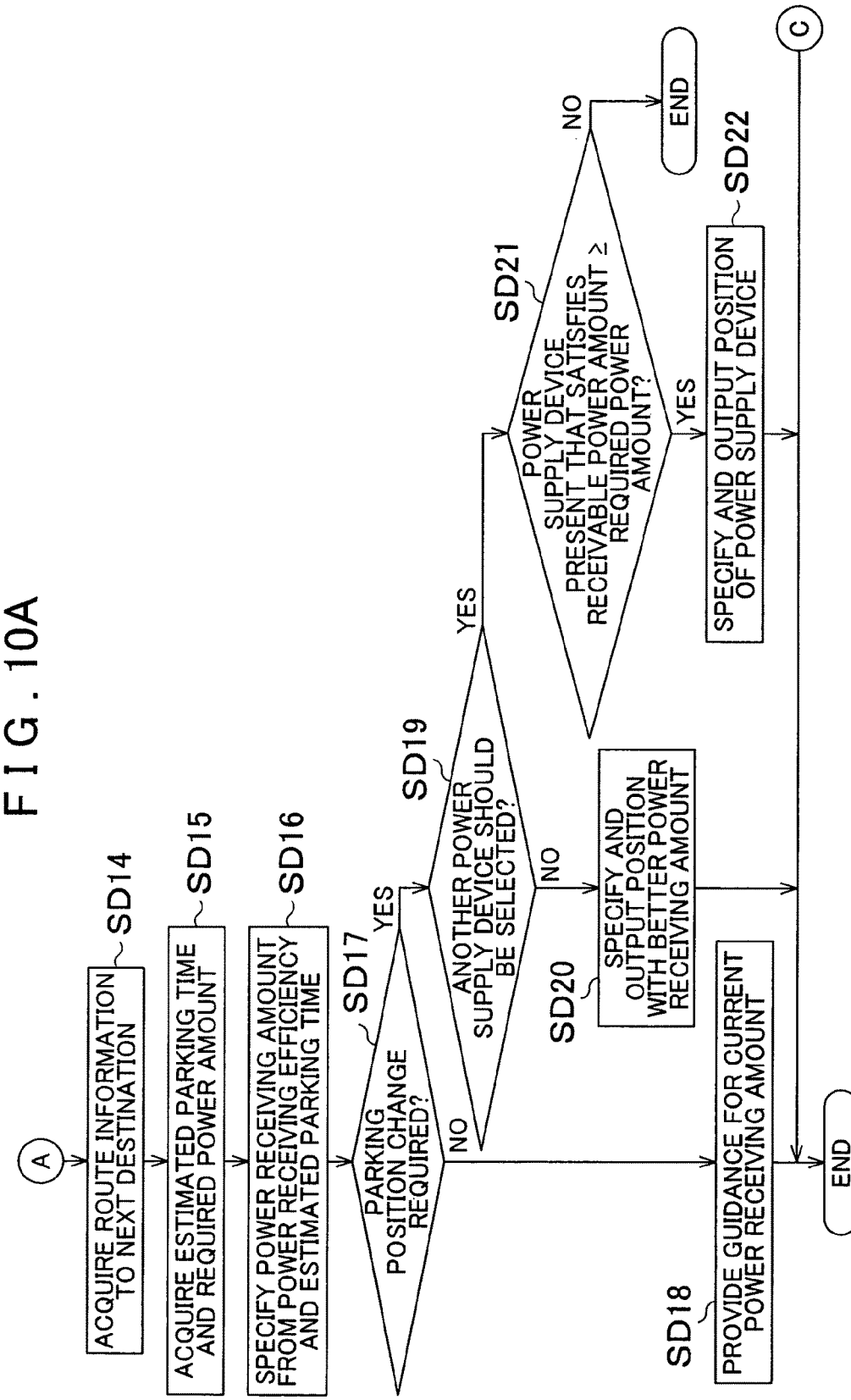
FIGS. 10A and 10B are flowcharts continuing from FIG. 9 of the power reception guidance process.
Figure 10B:
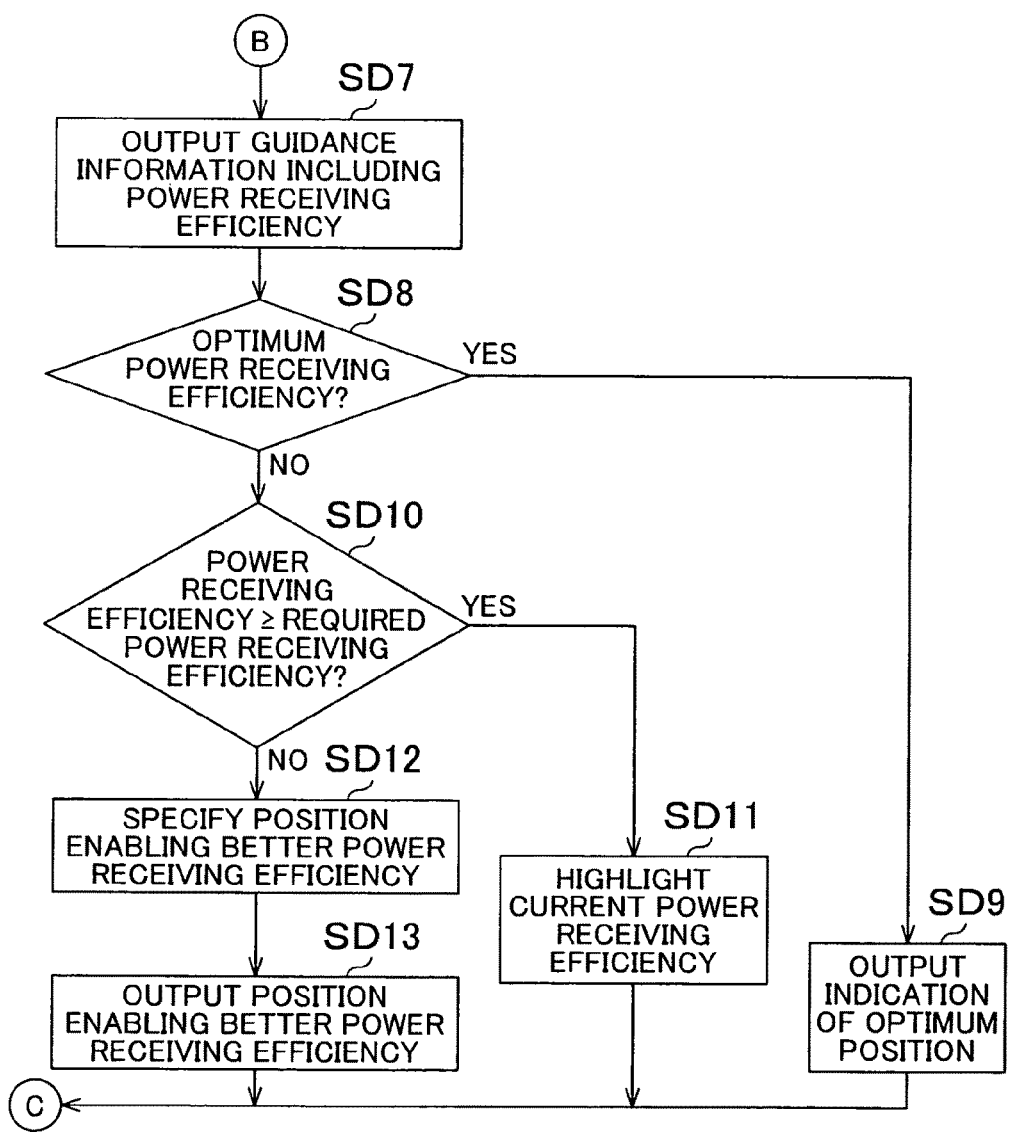

A fourth exemplary power reception guidance process that may be executed by one or more components of the power reception guidance system 1 will be explained below. The fourth example assumes that there is a plurality power supply devices 3 with different power supply capabilities installed in the parking area (e.g. a normal power supply device and a rapid power supply device that can supply a larger amount of power than the normal power supply device are installed). FIGS. 9, 10A, and 10B are flowcharts of the fourth example of the power reception guidance process (steps in the descriptions of each process below are abbreviated to "S"). The process may be implemented by the control unit 64 executing a computer program stored in the RAM, ROM, and/or the information storage unit 50. But, even though the exemplary structure of the above-described power reception guidance system 1 may be referenced in the description, it should be appreciated that the structure is exemplary and the process need not be limited by any of the exemplary structure. Note that the process content at SD1, SD2, and SD5 to SD18 in the power reception guidance process of the fourth example is identical to the process content at SA1 to SA16 in the power reception guidance process explained in the first example, and will be omitted here.

If the guidance control unit 64*b* determines at SD2 that power can be received in the vicinity of the position of the host vehicle 2 (YES at SD2), the power receiving efficiency specifying unit 64*d* refers to the power supply device information 65*b* of the map information DB65*a* and determines whether a plurality of power supply devices 3 is installed in the parking area entered by the host vehicle 2 (SD3). Consequently, if a plurality of power supply devices 3 is installed (YES at SD3), the power receiving efficiency specifying unit 64*d* specifies a receivable power amount that can be received by the power receiving unit 10 from each power supply device 3 in the parking area (SD4). The receivable power amount may be information that specifies a maximum power amount that the power receiving unit 10 can receive from each power supply device 3 per unit time, and included in performance information that is stored in advance in the map information DB65*a*. However, if a plurality of power supply devices 3 is not installed (NO at SD3), the routine proceeds to the process at SD5.

Meanwhile, if it is determined at SD17 that the parking position must be changed (YES at SD17), the determination unit 64*c* then determines whether another power supply device 3 should be selected (SD19). For example, if the required power amount can be received within the estimated parking time from the power supply device 3 installed at the current parking position based on the receivable power amount found at SD4, the determination unit 64*c* determines that the necessary power receiving amount can be received by correcting the current parking position and that another power supply device 3 should not be selected. However, if the required power amount cannot be received within the estimated parking time from the power supply device 3 installed at the current parking position, the determination unit 64*c* determines that the required power amount cannot be received even by correcting the current parking position and that another power supply device 3 should be selected.

Consequently, if it is determined that another power supply device 3 should not be selected (NO at SD19), the power receiving efficiency specifying unit 64*d* specifies a position with a better power receiving amount that can increase the power receiving amount, based on the positional relationship between the power supply device 3 and the power receiving unit 10 as specified by the positional relationship specifying unit 64*a*. The guidance control unit 64*b* then outputs guidance information that includes the position with the better power receiving amount through the speaker 62 or the display 63 (SD20).

However, if it is determined that another power supply device 3 should be selected (YES at SD19), the power receiving efficiency specifying unit 64*d* then determines, based on the receivable power amount found at SD4, whether there is a power supply device 3 in the parking area from which at least the required power amount can be received within the estimated parking time (SD21).

Figure 11:
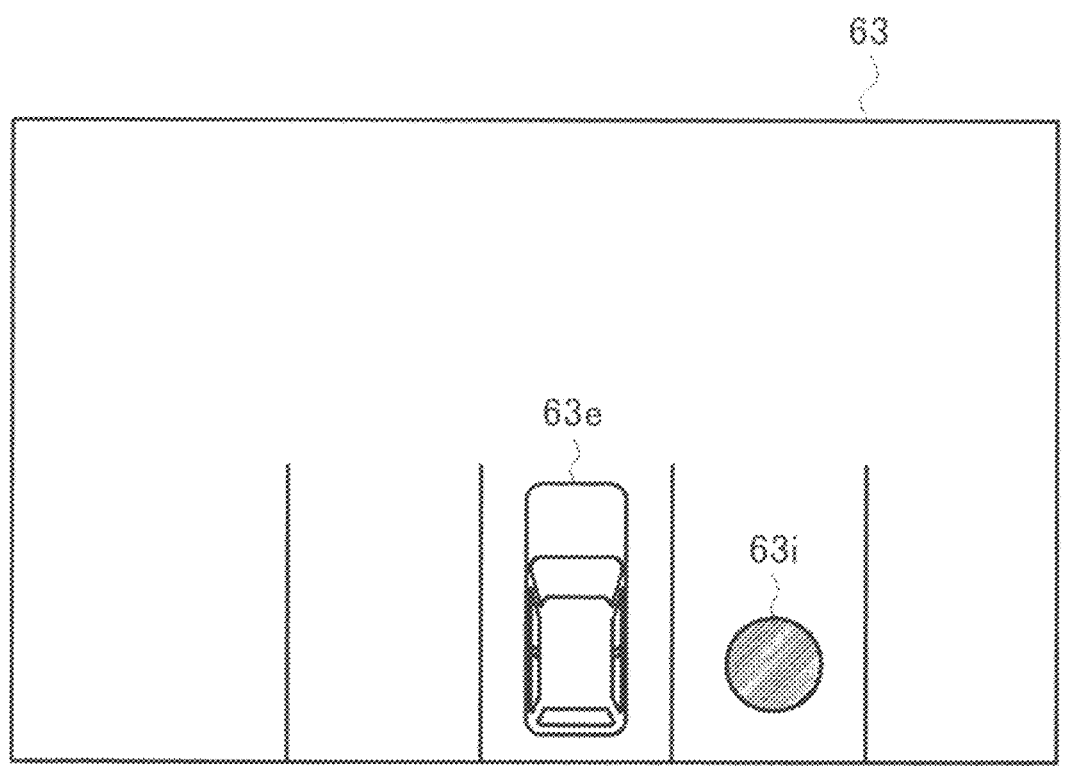
FIG. 11 is a drawing that illustrates a display that shows and outputs guidance information in the power reception guidance process.

Consequently, if it is determined that there is a power supply device 3 present from which at least the required power amount can be received (YES at SD21), the power receiving efficiency specifying unit 64*d* specifies the position of the power supply device 3 from which at least the required power amount can be received, based on the power supply device information 65*b*. The guidance control unit 64*b* then outputs guidance information that includes the position of the power supply device 3 through the speaker 62 or the display 63 (SD22). FIG. 11 is a drawing that illustrates the display 63 showing and outputting guidance information in the power reception guidance process of the fourth example. In the example shown in FIG. 11, the display 63 shows a power supply device marker 63*i*, which represents the position of the power supply device 3 from which at least the required power amount can be received.

However, if it is determined that there is no power supply device 3 present from which at least the required power amount can be received (NO at SD21), the guidance control unit 64*b* ends the power reception guidance process.

B. Effects

According to the fourth example as described above, in addition to the fundamental effects of the first example, the determination unit 64*c* determines whether another power supply device 3 should be selected based on a comparison of the receivable power amount that can be received from each power supply device 3 and the required power amount that should be received. The guidance control unit 64*b* then outputs information based on the determination result through the speaker 62 or the display 63. Therefore, if the parking position must be changed, guidance can be provided based on the determination result regarding whether another power supply device 3 should be selected.

V. Modifications

Exemplary implementations of the broad inventive principles were explained above. However, the specific configuration and units for implementing these principles may be modified and improved in any manner or form within the broad scope of the principles. Examples of such modifications are explained below.

Application of the inventive principles may vary depending on the environment in which the present invention is practiced and the detailed configuration thereof. The above problems may be only partially solved, and the above effects only partially achieved.

In the examples explained above, the power receiving efficiency specifying unit 64*d* specifies the power receiving efficiency based on the field intensity of the power receiving unit 10, and the positional relationship between the power supply device 3 and the power receiving unit 10. However, the power receiving efficiency may also be specified based on the magnitude of an induction current in the secondary coil of the power receiving unit 10 or in a coil separately provided for specifying the power receiving efficiency, which is generated due to changes in the magnetic field generated by the power supply device 3. Furthermore, image data around the power supply device 3 taken by the camera 40 may also be output to and shown on the display 63 so that a user such as the driver can judge the power receiving efficiency based on the image data.

Furthermore, the order of the various steps can be changed as necessary. For example, in the Second Example, the required power receiving efficiency of SB8 can also be specified in SB14 of FIG. 7A. That is, the determination unit 64c can also specify the required power receiving efficiency based on the specified required power amount and the estimated parking time.

If the necessary power reception can also be achieved from a power supply device 3 with a smaller power supply capability than the power supply device 3 at the parking position, guidance information promoting a change in the parking position may be output. Accordingly, the power supply device 3 with a larger power supply capability can be used for another vehicle that needs to receive a large amount of power.

\* \* \*

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

What is claimed is:

1. A power reception guidance device for installation in a vehicle having a power receiving unit, the device providing guidance to a non-contact power supply of a power supply unit installed in a parking area, the device comprising:
   a controller that:
      calculates an amount of required power that should be received by the power receiving unit;
      calculates an estimated parking time of the vehicle based on an average parking time associated with a type of facility where the parking area is located;
      calculates a power receiving efficiency of the power receiving unit at a current parking position of the vehicle in the parking area;
      calculates a power receiving amount to be received by the power receiving unit while the vehicle is parked, the power receiving amount being calculated based on the calculated power receiving efficiency and the calculated estimated parking time; and
      determines whether the current parking position must be changed based on the calculated power receiving amount and the calculated required power amount; and
   an output unit that outputs information based on the determination.

2. The power reception guidance device according to claim 1, wherein the controller:
   acquires route information identifying a route from the parking position to a subsequent destination; and
   calculates the required power amount based on the acquired route information.

3. The power reception guidance device according to claim 1, wherein, if the controller determines that the parking position must be changed:
   the controller determines a new parking position where a power receiving efficiency will be greater than or equal to the required efficiency; and
   the output unit outputs guidance to the new parking position.

4. The power reception guidance device according to claim 1, further comprising:
   a data storage unit that stores power supply device information for a plurality of power supply devices, the power supply device information including the maximum amount of power that can be received from each of the plurality of power supply devices; and
   a power amount detector that detects the amount of power that can be received at the current parking position;
   wherein the controller calculates the power receiving efficiency based on the stored power supply device information and the detected power amount.

5. The power reception guidance device according to claim 4, wherein the power amount detector comprises at least one of a magnetic sensor, a camera, and a coil of the power receiving unit.

6. A navigation device comprising the power reception guidance device of claim 1.

7. A power reception guidance method for guiding a vehicle having a power receiving unit to a non-contact power supply of a power supply unit installed in a parking area, the method comprising:
   calculating, with a controller, a power receiving efficiency of the power receiving unit at a current parking position of the vehicle in the parking area;
   calculating, with the controller, an amount of required power that should be received by the power receiving unit;
   calculating, with the controller, an estimated parking time of the vehicle based on an average parking time associated with a type of facility where the parking area is located;
   calculating, with the controller, a power receiving amount to be received by the power receiving unit while the vehicle is parked, the power receiving amount being calculated based on the calculated power receiving efficiency and the calculated estimated parking time;
   determining, with the controller, whether the current parking position must be changed based on the calculated power receiving amount and the calculated required power amount; and
   outputting information based on the determination to an output unit.

8. The power reception guidance method according to claim 7, further comprising:
   acquiring route information identifying a route from the parking position to a subsequent destination; and
   calculating the required power amount based on the acquired route information.

9. The power reception guidance method according to claim 7, further comprising, if it is determined that the parking position must be changed:
   determining a new parking position where a power receiving efficiency will be greater than or equal to the required efficiency; and
   outputting guidance to the new parking position.

10. The power reception guidance method according to claim 7, further comprising:
    storing power supply device information for a plurality of power supply devices in a data storage unit, the power supply device information including the maximum amount of power that can be received from each of the plurality of power supply devices;
    detecting the amount of power that can be received at the current parking position; and
    calculating the power receiving efficiency based on the stored power supply device information and the detected power amount.

11. The power reception guidance method according to claim 10, wherein the detected power amount is detected with at least one of a magnetic sensor, a camera, and a coil of the power receiving unit.

12. A non-transitory computer-readable storage medium storing a computer-executable power reception guidance program for guiding a vehicle having a power receiving unit to a non-contact power supply of a power supply unit installed in a parking area, the program comprising:
instructions for calculating a power receiving efficiency of the power receiving unit at a current parking position of the vehicle in the parking area;
instructions for calculating an amount of required power that should be received by the power receiving unit;
instructions for calculating an estimated parking time of the vehicle based on an average parking time associated with a type of facility where the parking area is located;
instructions for calculating a power receiving amount to be received by the power receiving unit while the vehicle is parked, the power receiving amount being calculated based on the calculated power receiving efficiency and the calculated estimated parking time;
instructions for determining whether the current parking position must be changed based on the calculated power receiving amount and the calculated required power amount; and
instructions for outputting information based on the determination.

13. A power reception guidance device for installation in a vehicle having a power receiving unit, the device providing guidance to a non-contact power supply of a power supply unit installed in a parking area, the device comprising:
a controller that:
calculates an amount of required power that should be received by the power receiving unit;
calculates an estimated parking time of the vehicle based on an average parking time associated with a type of facility where the parking area is located;
calculates a required efficiency based on the calculated required power amount and the calculated estimated parking time;
calculates a power receiving efficiency of the power receiving unit at a current parking position of the vehicle in the parking area;
determines whether the parking position must be changed based on a comparison of the calculated power receiving efficiency and the required efficiency; and
an output unit that outputs information based on the determination.

14. A power reception guidance device for installation in a vehicle having a power receiving unit, the device providing guidance to a non-contact power supply of a power supply unit installed in a parking area, the device comprising:
a controller that:
calculates an amount of required power that should be received by the power receiving unit;
calculates an estimated parking time of the vehicle based on an average parking time associated with a type of facility where the parking area is located;
calculates a power receiving efficiency of the power receiving unit at a current parking position of the vehicle in the parking area;
calculates a power receiving time necessary for the power reception of the power receiving unit based on the calculated power receiving efficiency and the calculated required power amount;
determines whether the current parking position must be changed based on the calculated power receiving time and the calculated estimated parking time; and
an output unit that outputs information based on the determination.

15. A power reception guidance method for guiding a vehicle having a power receiving unit to a non-contact power supply of a power supply unit installed in a parking area, the method comprising:
calculating, with a controller, an amount of required power that should be received by the power receiving unit;
calculating, with the controller, an estimated parking time of the vehicle based on an average parking time associated with a type of facility where the parking area is located;
calculating, with the controller, a required efficiency based on the calculated required power amount and the calculated estimated parking time;
calculating, with the controller, a power receiving efficiency of the power receiving unit at a current parking position of the vehicle in the parking area;
determining, with the controller, whether the current parking position must be changed based on a comparison of the calculated power receiving efficiency and the required efficiency; and
outputting information based on the determination to an output unit.

16. A power reception guidance method for guiding a vehicle having a power receiving unit to a non-contact power supply of a power supply unit installed in a parking area, the method comprising:
calculating, with a controller, an amount of required power that should be received by the power receiving unit;
calculating, with the controller, an estimated parking time of the vehicle based on an average parking time associated with a type of facility where the parking area is located;
calculating, with the controller, a power receiving efficiency of the power receiving unit at a current parking position of the vehicle in the parking area;
calculating, with the controller, a power receiving time necessary for the power reception of the power receiving unit based on the calculated power receiving efficiency and the calculated required power amount;
determining, with the controller, whether the current parking position must be changed based on the calculated power receiving time and the calculated estimated parking time; and
outputting information based on the determination to an output unit.

* * * * *